Nov. 3, 1925.
I. DYE
1,560,046
METERING OR MEASURING DEVICE
Filed Nov. 12, 1924
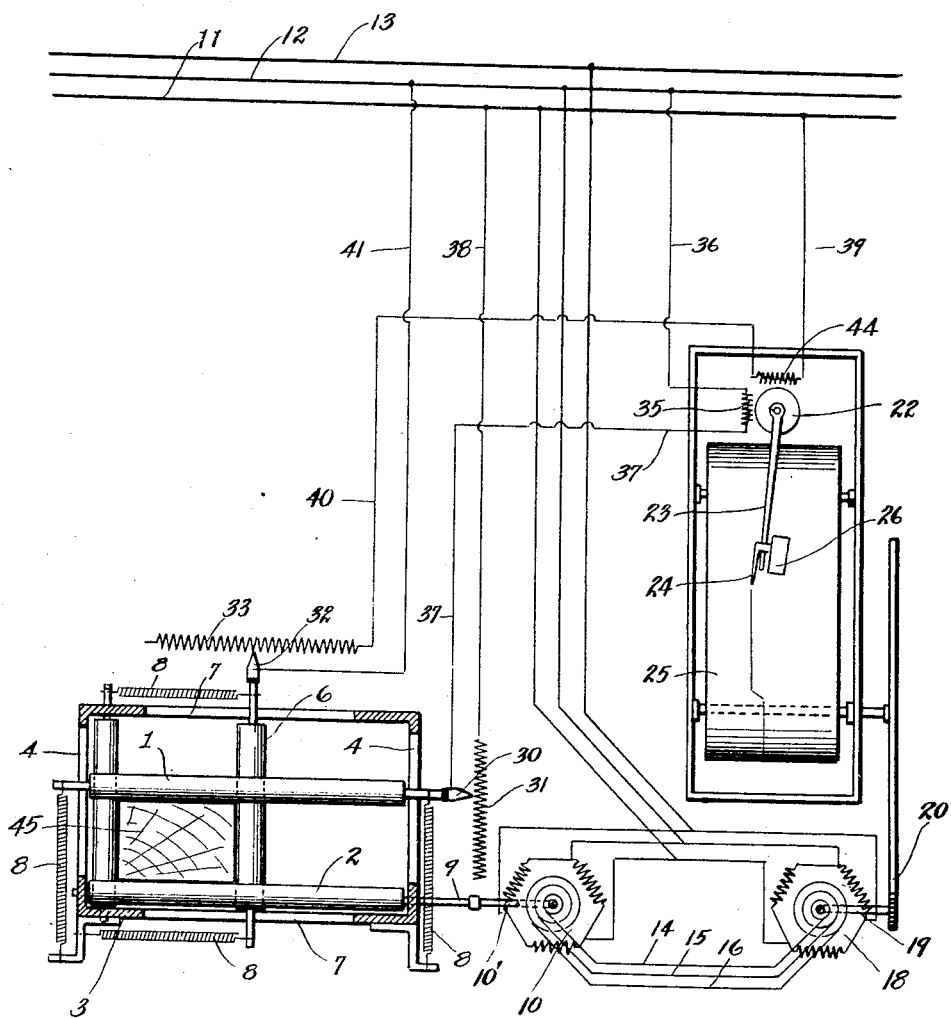
INVENTOR
IRA DYE
BY
Richard J. Cook
ATTORNEY Patented Nov. 3, 1925.

1,560,046

UNITED STATES PATENT OFFICE.

IRA DYE, OF SEATTLE, WASHINGTON.

METERING OR MEASURING DEVICE.

Application filed November 12, 1924. Serial No. 749,474.

*To all whom it may concern:*

Be it known that I, IRA DYE, a citizen of the United States, and a resident of Seattle, King County, Washington, have invented certain new and useful Improvements in Metering or Measuring Devices, of which the following is a specification.

This invention relates to improvements in metering, or measuring devices and more particularly to means for measuring and recording of volumes of moving pieces such as lumber, iron bars, etc., the principal object of this invention being to provide a certain combination of mechanical and electrically operated devices for measuring and recording the board feet in pieces of lumber which may be delivered through the machine.

It is a further object of the invention to provide a device of the above character that is relatively simple in construction, inexpensive to operate and which permits the locating of the recording instruments at a point removed from the place at which the actual measuring is done.

In accomplishing these and other objects of the invention, I have provided the improved details of construction, the preferred forms of which are illustrated in the accompanying drawing which shows diagrammatically a metering or measuring device embodied by the present invention.

Referring more in detail to the drawings—

1 and 2, respectively, designate paired rollers disposed horizontally in parallel relation one above the other with the lower roller mounted in a suitable conveyer frame structure 3 along which pieces of lumber, or the like, may be advanced; the axis of the upper roller being contained at its ends slidably within guide grooves 4 for vertical movement from and toward the lower roller.

Located adjacent to the rollers 1 and 2 are paired rollers 5 and 6 disposed vertically in parallel relation with roller 5 mounted in the frame structure 3 and roller 6 having the ends of its axis movably located in guide slots 7 of the frame for movement from and toward the roller 5 in accordance with the dimensions of pieces of material advanced between them. Suitable springs, as designated at 8, are provided for yieldably resisting the spreading apart of the rollers and for drawing them tightly against the pieces that are advanced between them.

The axle 9 of the stationary or lower horizontal roller is extended and is connected to the rotor shaft 10' of a phase wound induction motor, designated at 10, whose stator is energized by suitable three-phase potential windings connected with circuit wires 11—12 and 13. The rotor of motor 10 is electrically connected by wires 14, 15, 16 with the rotor of a similar second phase wound motor 18 also energized from the same three-phase potential as motor 10.

The shaft 19 of motor 18, through suitable gearing, as designated at 20, operates the paper roll driving mechanism of a curve drawing watt meter 22 having a moving element 23 equipped with a pan, or other suitable marker 24, for drawing a continuous line on the paper roll 25. The moving element also carries a polar planimeter, designated at 26, which operates to record the area between the curve line and the zero line of the watt-meter pen.

The movable vertical roller 1 carries an electrical contactor 30 that is movable therewith along a rheostat 31 in accordance with the adjustment of the roller so that the resistance of the rheostat will vary inversely as the distance between the rolls. The movable horizontal roller also carries a contactor 32 movable therewith along a rheostat 33 so that the resistance is inversely proportional to the distance between the rollers.

The vertical coil 35 of the watt meter is electrically connected by wires 36—37 and 38 through the contactor 30 and resistance 31 with the circuit wires 11 and 12 and the horizontal coil 44 is connected by wires 39—40 and 41 through contactor 32 and resistance 33 with circuit wires 12 and 13.

With the parts so constructed the operation would be as follows:

The piece to be measured, as designated at 45, is advanced between the paired rollers 1—2 and 5—6 in such manner as to have the four rollers in contact with the four sides of the piece and so that the roller 2 will be driven at the same tangential speed as the piece. The rotor of motor 10 will then make exactly as many revolutions as the roller 2 and motor 18 is constrained by its electrical connections to make exactly as many revolutions as motor 10. The travel of the paper roll operated by motor 18 through gearing 20 then is proportional to the length of the piece delivered through the rollers.

The current delivered to the watt meter 22 through the resistance 31 is multiplied by that delivered through resistance 33 and this causes the marker, or pen to give a deflection which varies as the product of the circuits, or as the area of the cross section of the piece; and since the travel of the paper roll is proportional to the length of the piece, the area under the curve will be proportional to the volume of the piece. This volume is recorded by the planimeter 26 and also by the area under the curve.

Having thus described my invention, what I claim as new therein and desire to secure by Letters-Patent, is:

1. A metering device of the character described comprising members mounted yieldably for movement in accordance with the width and thickness of pieces of material advanced for measurement in engagement therewith, a record strip, means operable by the movement of pieces being measured for advancing the record strip in proportion to the length of measured pieces and a volume recording instrument operable by the movement of said strip and under the control of said yieldably mounted members.

2. A metering device of the character described comprising, in combination, an electric circuit, a pair of horizontal rollers and a pair of vertical rollers between which pieces of material are advanced for measurement; one roller of each pair being movable from and toward the other in accordance with the width and thickness of pieces measured, an electrical contact or for each movable roller, a resistance element for each contactor and along which said contactors are adjustable to vary the resistance inversely as the distance between the paired rollers, a record strip, means operable by one of said rollers for advancing the record strip proportional to the length of pieces of material measured, and a watt meter having connections with the circuit through the two resistance elements having a recording element operable on the record strip and which is movable in accordance with the amount of resistance placed in the circuits.

Signed at Seattle, King County, Washington, this 3rd day of November, 1924.

IRA DYE.